UNITED STATES PATENT OFFICE.

WILLIAM R. MEAD, OF FOWLERVILLE, MICHIGAN.

MEDICAL COMPOUND.

SPECIFICATION forming part of Letters Patent No. 254,356, dated February 28, 1882.

Application filed October 31, 1881. (No specimens.)

*To all whom it may concern:*

Be it known that I, WILLIAM R. MEAD, of Fowlerville, in the county of Livingston and State of Michigan, have invented certain new and useful Improvements in Medical Compounds; and I do hereby declare that the following is a full, clear, and exact description of the invention, which will enable others skilled in the art to which it appertains to make and use the same.

My invention relates to medical compounds for the treatment of epilepsy (falling sickness) and diseases of a kindred nature; and it consists in the mixture hereinafter more fully described and claimed.

The following is the formula of the mixture, viz: tincture of nux vomica, two drams, bromide of ammonia, two drams; bromide of potash, eighteen drams; bicarbonate of potash, forty-five grains; tincture of columbo, four and one-half ounces; and distilled water, nine ounces. Mix and administer in doses of two tea-spoonfuls in a little water three times a day, one hour before each meal, to be continued for the period of about three months.

I have used this medicine with satisfactory results in the treatment of epilepsy, and am not aware that the same combination of ingredients has ever been used prior to my invention.

I am well aware that the bromides have been used in the treatment of this disease separately or in compound mixtures, and also that the other ingredients have been used separately or in compound mixtures for the treatment of various diseases, and I do not therefore claim compounds containing said ingredients, except in the specific combination described.

I claim and desire to secure by Letters Patent—

A medical compound for the treatment of epilepsy, composed of tincture of nux vomica, bromide of ammonia, bromide of potash, bicarbonate of potash, tincture of columbo, and distilled water, mixed in about the proportions set forth.

In testimony that I claim the foregoing as my own I have hereunto affixed my signature in presence of two witnesses.

WILLIAM R. MEAD, M. D.

Witnesses:
JARED S. COOK,
THOMAS RILEY.